(12) United States Patent
Yoshida et al.

(10) Patent No.: US 11,208,071 B2
(45) Date of Patent: Dec. 28, 2021

(54) AIRBAG

(71) Applicant: SUMISHO AIRBAG SYSTEMS CO., LTD., Matsuura (JP)

(72) Inventors: Masatoshi Yoshida, Matsuura (JP); Teppei Harabayashi, Matsuura (JP)

(73) Assignee: SUMISHO AIRBAG SYSTEMS CO., LTD., Matsuura (JP)

( * ) Notice: Subject to any disclaimer, the term of this patent is extended or adjusted under 35 U.S.C. 154(b) by 54 days.

(21) Appl. No.: 16/645,073

(22) PCT Filed: Sep. 6, 2018

(86) PCT No.: PCT/JP2018/033032
§ 371 (c)(1),
(2) Date: Mar. 6, 2020

(87) PCT Pub. No.: WO2019/049930
PCT Pub. Date: Mar. 14, 2019

(65) Prior Publication Data
US 2020/0282944 A1  Sep. 10, 2020

(30) Foreign Application Priority Data

Sep. 7, 2017 (JP) .............................. JP2017-172477

(51) Int. Cl.
*B60R 21/235* (2006.01)
*B60R 21/2338* (2011.01)
(Continued)

(52) U.S. Cl.
CPC ........ *B60R 21/235* (2013.01); *B60R 21/2338* (2013.01); *B60R 21/207* (2013.01);
(Continued)

(58) Field of Classification Search
CPC ............. B60R 21/235; B60R 21/2338; B60R 21/207; B60R 21/237; B60R 2021/23509;
(Continued)

(56) References Cited

U.S. PATENT DOCUMENTS 6,296,276 B1 * 10/2001 Ritter .................. B60R 21/2338
280/743.2
10,899,308 B2 * 1/2021 Yoshida ............. B60R 21/2334
(Continued)

FOREIGN PATENT DOCUMENTS

EP          3418129 A1    12/2018
JP       2010-159026 A     7/2010
(Continued)

OTHER PUBLICATIONS

International Search Report, issued in PCT/JP2018/033032, PCT/ISA/210, dated Oct. 23, 2018.
(Continued)

*Primary Examiner* — Drew J Brown
(74) *Attorney, Agent, or Firm* — Birch, Stewart, Kolasch & Birch, LLP

(57) ABSTRACT

Provided is an airbag which further reduces the degree of injury to a vehicle occupant while also exhibiting sufficient occupant protection performance using less output from the inflator, by both preventing airbag internal pressure from rising excessively when making contact with the occupant and increasing the speed of deployment in an occupant-protection area. This hollow-weave airbag has an opening in a main chamber that inflates for the purpose of occupant protection, a structure wherein a first yarn extending separatingly from a first fabric layer of the opening to a non-inflating portion is caught on a float yarn extending on the inside of a second fabric layer and subsequently caught on a float yarn extending on the inside of the first fabric layer,
(Continued)

this structure being repeated at least once and forming a pair with another structure wherein a second yarn extending separatingly from the second fabric layer of the opening to the non-inflating portion is caught on the float yarn extending on the inside of the first fabric layer and subsequently caught on the float yarn extending on the inside of the second fabric layer, this structure being repeated at least once.

5 Claims, 8 Drawing Sheets

(51) Int. Cl.
    *B60R 21/207*     (2006.01)
    *B60R 21/237*     (2006.01)

(52) U.S. Cl.
    CPC ... *B60R 21/237* (2013.01); *B60R 2021/23509* (2013.01); *B60R 2021/23542* (2013.01)

(58) Field of Classification Search
    CPC .......... B60R 2021/23542; B60R 2021/23547; B60R 2021/2395; B60R 21/23; B60R 21/239
    See application file for complete search history.

(56) References Cited

U.S. PATENT DOCUMENTS

| | | | |
|---|---|---|---|
| 2005/0253367 A1* | 11/2005 | Heigl | B60R 21/232 280/730.2 |
| 2009/0206587 A1 | 8/2009 | Abe | |
| 2009/0224521 A1* | 9/2009 | Huber | D03D 5/00 280/743.1 |
| 2013/0113195 A1* | 5/2013 | Finn | B60R 21/235 280/743.2 |
| 2015/0042082 A1 | 2/2015 | Koshikawa et al. | |
| 2015/0137488 A1 | 5/2015 | Fischer | |
| 2015/0151710 A1* | 6/2015 | Tanaka | B60R 21/232 280/743.2 |
| 2016/0368448 A1* | 12/2016 | Yoshida | B60R 21/232 |
| 2017/0106830 A1* | 4/2017 | Rohn | B60R 21/235 |
| 2017/0334388 A1* | 11/2017 | Yoshida | B60R 21/233 |
| 2017/0344388 A1 | 11/2017 | Ramos da Rocha | |
| 2020/0047704 A1* | 2/2020 | Kodera | B60R 21/235 |

FOREIGN PATENT DOCUMENTS

| | | |
|---|---|---|
| JP | 2012-20628 A | 2/2012 |
| JP | 5007539 B2 | 8/2012 |
| JP | 2013-203166 A | 10/2013 |
| JP | 2016-97776 A | 5/2016 |
| JP | 2017-94799 A | 6/2017 |
| JP | 2017-144961 A | 8/2017 |

OTHER PUBLICATIONS

Extended European Search Report for European Application No. 18853599.1, dated Dec. 1, 2020.

* cited by examiner

AIRBAG

TECHNICAL FIELD

The present invention relates to an air-bag that deploys and inflates by inflow of inflation gas supplied from an inflator for protecting an occupant when an automobile collides with another automobile or an obstacle, and more particularly to an air-bag that is capable of both reducing a degree of injury to an occupant and reducing usage of the inflator gas.

BACKGROUND ART

Most passenger automobiles currently manufactured have so-called driver's seat and front-passenger's seat air-bags installed therein that, when a front side of an automobile collides with another automobile or an obstacle (head-on collision), rapidly inflates a bag body between an occupant and an automobile interior structure to ensure safety of the occupant.

In recent years, more and more automobiles include a curtain air-bag system mounted thereto in order to protect a head and other parts of the occupant not only in case of the head-on collision but also in case where a side of the automobile collides with another automobile or an obstacle (side collision). The curtain air-bag system is folded and stored in a ceiling section above side window sections or in pillar sections of an automobile, and inflates to cover the side window sections upon collision.

Such an air-bag is required to increase a deployment speed during deployment and inflation and provide immediate coverage of an occupant protection area and to further reduce a degree of injury on a human body, when the deployed air-bag makes contact with the occupant.

Patent Literature 1 discloses an air-bag including a main chamber and an auxiliary chamber, and in the air-bag, the main chamber and the auxiliary chamber are connected together via a communication part, and the communication part includes a multi-layer structure of three or more layers.

However, in such a structure that controls gas flow by placing a multi-layer woven structure in the communication part as disclosed in Patent Literature 1, opening control of the communication part depends on a pressure of the main chamber, and there is a problem in that occupant abutment does not necessarily coincide with opening timing of the communication part.

Patent Literature 2 discloses an air-bag comprising a lid member that covers a vent hole, and a tether member that extends through the air-bag to tether the lid member to an occupant opposing surface, and in the air-bag, an occupant abuts against the air-bag to retract the occupant opposing surface, and the lid member departs from the vent hole due to a gas pressure in the air-bag, to open the vent hole.

While such a method as disclosed in Patent Literature 2 is extremely excellent in that a vent function is triggered and activated by occupant collision, it has a problem in that a mechanism is complicated and production takes time and labor.

CITATION LIST

Patent Literature

PATENT LITERATURE 1: JP-A-2016-97776
PATENT LITERATURE 2: JP-B2-5007539

SUMMARY OF INVENTION

Technical Problem

An object of the present invention is to provide a hollow-weave air-bag that reduces air-bag rebound by increasing a deployment speed of a main chamber that inflates for a purpose of occupant protection, while releasing gas from the main chamber when making contact with an occupant, and that efficiently absorbs kinetic energy of the occupant. Another object of the present invention is to provide an air-bag that can decrease a gas capacity of an inflator.

Solution to Problem

To achieve the above objects, according to the present invention, provided is an air-bag 10 integrally formed by hollow weaving.

The air-bag 10 includes a main chamber 11 that inflates, and a non-inflating portion 13.

The main chamber 11 has a two-layer structure comprising a first fabric layer 110 and a second fabric layer 120.

The main chamber 11 includes an opening 12 continuously formed by the hollow weaving and communicating with an outside, or a communication part 12' communicating with an auxiliary chamber in the air-bag.

The first fabric layer 110 includes one or more first float yarns 112 once separating from the first fabric layer 110 and returning to the first fabric layer 110.

The second fabric layer 120 includes one or more second float yarns 122 once separating from the second fabric layer 120 and returning to the second fabric layer 120.

The air-bag has a structure where a plurality of filaments organizing the first fabric layer 110 extend separately from the first fabric layer 110 in the opening 12 or the communication part 12' to the non-inflating portion 13, to form a first yarn 111, the first yarn 111 is, in order seen from the opening 12 or the communication part 12', caught on the one or more second float yarns 122, or constitutes a woven organization with the second float yarns 122, and is subsequently caught on the one or more first float yarns 112, or constitutes a woven organization with the first float yarns 112, the structure being repeated at least once. And, the air-bag has a structure where a plurality of filaments organizing the second fabric layer 120 extend separately from the second fabric layer 120 in the opening 12 or the communication part 12' to the non-inflating portion 13, to form a second yarn 121, and the second yarn 121 is, in order seen from the opening 12 or the communication part 12', caught on the one or more first float yarns 112, or constitutes a woven organization with the first float yarns 112, and is subsequently caught on the one or more second float yarns 122, or constitutes a woven organization with the second float yarns 122, the structure being repeated at least once.

During air-bag inflation, the first yarn 111 and the second yarn 121 are pulled by the first float yarns 112 and the second float yarns 122 to apply tension, and operate to close the opening 12 or the communication part 12'.

When making contact with an occupant, by deformation of the air-bag due to the contact, the first yarn 111 and the second yarn 121 are loosened, and the opening 12 or the communication part 12' is opened to release gas from the main chamber.

In another aspect of the present invention, at least one of the first yarn 111 and the second yarn 121 extending out of the opening 12 or the communication part 12' is not connected to the non-inflating portion 13, but is connected to the first or second fabric layer 110, 120.

Furthermore, in still another aspect of the present invention, when at least one of the first yarn 111 and the second yarn 121 extending out of the opening 12 or the communication part 12' is, in the case of the first yarn 111, caught on the one or more second float yarns 122, or constitutes a woven organization with the second float yarns 122, or is, in the case of the second yarn 121, is caught on the one or more first float yarns 112, or constitutes a woven organization with the first float yarns 112, and is connected to the original fabric layer.

Additionally, in a further aspect of the present invention, the first yarn 111 and the second yarn 121 are arranged over a full width of the opening 12 or the communication part 12', or over a range in excess of the full width.

DESCRIPTION OF EMBODIMENTS

Figure 1:
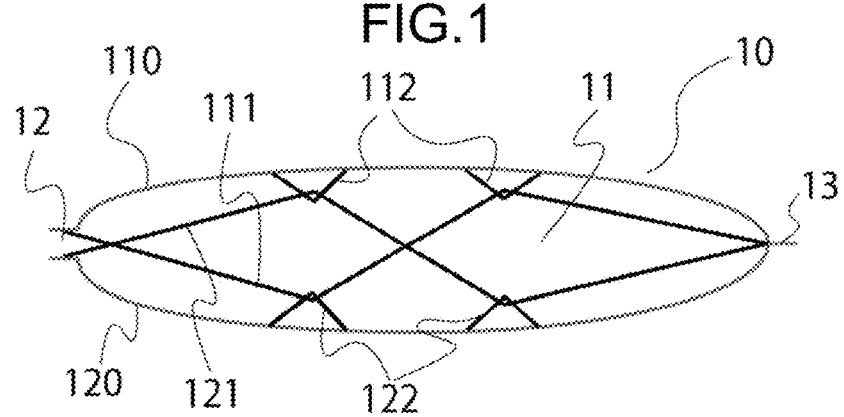
FIG. 1 is a schematic view of an air-bag of the present invention.

FIG. 1 shows a schematic view of an example of an air-bag according to the present invention. An air-bag 10 of the present invention is the air-bag 10 integrally formed by hollow weaving. The air-bag 10 includes a main chamber 11 that inflates, and a non-inflating portion 13. The main chamber 11 has a two-layer structure comprising a first fabric layer 110 and a second fabric layer 120. The main chamber 11 includes an opening 12 continuously formed by the hollow weaving and communicating with an outside.

The first fabric layer 110 includes one or more first float yarns 112 once separating from the first fabric layer 110 and returning to the first fabric layer 110. Furthermore, the second fabric layer 120 includes one or more second float yarns 122 once separating from the second fabric layer 120 and returning to the second fabric layer 120. The air-bag has a structure where a plurality of filaments organizing the first fabric layer 110 extend separately from the first fabric layer 110 in the opening 12 to the non-inflating portion 13, to form a first yarn 111, and the first yarn 111 is, in order seen from the opening 12, caught on the one or more second float yarns 122 and is subsequently caught on the one or more first float yarns 112, the structure being repeated at least once. Furthermore, the air-bag has a structure where a plurality of filaments organizing the second fabric layer 120 extend separately from the second fabric layer 120 in the opening 12 to the non-inflating portion 13, to form a second yarn 121, and the second yarn 121 is, in order seen from the opening 12, caught on the one or more first float yarns 112, and is subsequently caught on the one or more second float yarns 122, the structure being repeated at least once. Furthermore, the first yarn 111 and the second yarn 121 are configured to form a pair.

Figure 2:
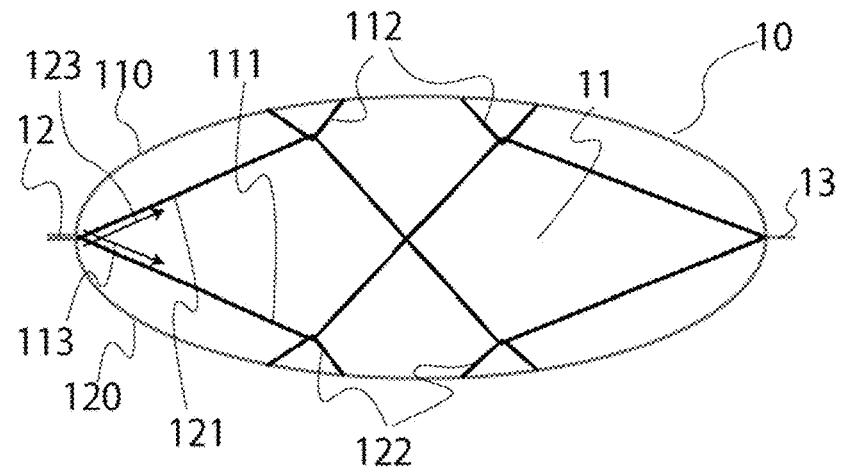
FIG. 2 is a schematic view showing the air-bag of the present invention that is inflated.

When the air-bag shown in FIG. 1 is filled with a gas and further inflated, the first yarn 111 and the second yarn 121 are pulled by the first float yarn and the second float yarn to thereby apply tension, and the tension acts to close the opening 12 as shown in FIG. 2 (113, 123). The higher a pressure in the air-bag increases, the more the tension to be applied to the yarn increases. Accordingly, a force to close the opening 12 also increases, and hence the gas hardly leaks from the opening. Due to this action, the air-bag of the present invention does not have any wasted gas leaking from the opening before making contact with an occupant, thereby enabling a capacity of an inflator to be smaller than that in an air-bag including a simple opening.

Figure 3:
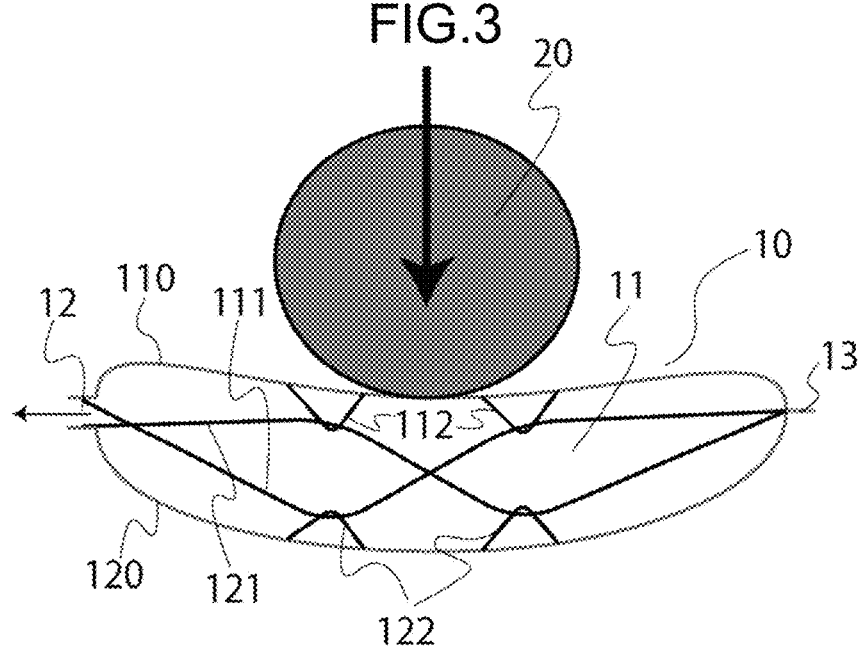
FIG. 3 is a schematic view showing that the air-bag of the present invention makes contact with an occupant.

Next, a behavior in case where the occupant abuts against the main chamber of the air-bag that is sufficiently filled with the gas will be described with reference to a schematic view shown in FIG. 3. As shown in FIG. 2, strong tension is applied to the first yarn 111 and the second yarn 121, and the opening closes before the occupant abuts. However, when an occupant 20 abuts to deform the air-bag, the tension applied to the first yarn 111 and the second yarn 121 that are present in the main chamber weakens. Due to the pressure applied into the air-bag, the opening 12 opens, and when the gas stagnating in the air-bag is released, the pressure in the air-bag decreases. As seen from this structure, at least one of the first float yarn 112 and the second float yarn 122 is preferably disposed at a position on which the occupant roughly abuts.

If the occupant abuts against the air-bag that does not include any opening in the main chamber, the pressure in the air-bag simply rises in accordance with change of the air-bag capacity due to the abutment of the occupant. It is known that this rise in internal pressure performs a function of protecting the occupant, and that excessive rise in internal pressure increases a degree of injury to the occupant. According to the air-bag of the present invention, the gas in the air-bag that makes contact with the occupant is released to the outside, so that excessive rise in the internal pressure can be prevented, and the degree of injury to the occupant can be reduced.

Figure 4:
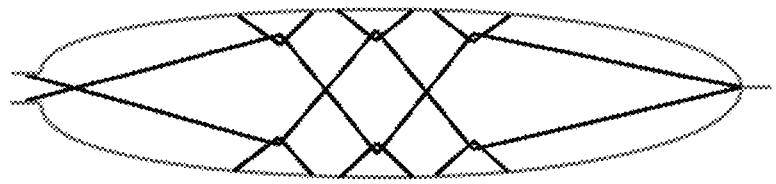
FIG. 4 is a view showing that a number of repetitions of a first yarn and a second yarn caught on a first float yarn and a second float yarn is set to 1.5 times.

Description is made with reference to FIG. 1 on assumption that a number of repetitions of the first yarn 111 and the second yarn 121 caught on the first float yarn 112 and the second float yarn 122 is one, but the number is not specifically limited as long as the number of the repetition of each yarn that performs a function of closing the opening is one or more. However, if the repetition number of the yarn to be caught on the float yarn increases, a thickness of the inflated air-bag decreases. Consequently, during use as the air-bag, the number of the repetitions is usually preferably from one to about four, and more preferably from one to about 2.5. For reference, FIG. 4 shows a schematic view in case where the number of the repetitions of the first yarn 111 and the second yarn 121 caught on the first float yarn 112 and the second float yarn 122, respectively, is 1.5 times.

Figure 5:
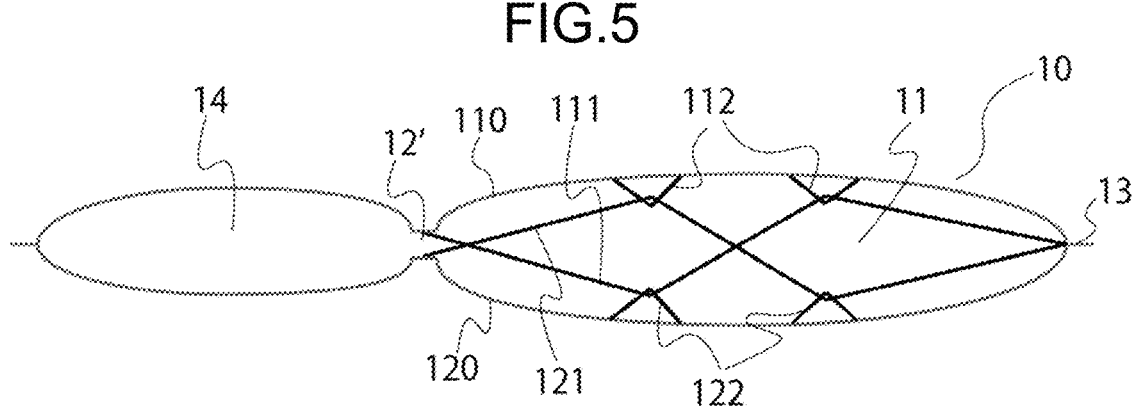
FIG. 5 is a schematic view of the air-bag of the present invention including an auxiliary chamber.

In the air-bag of the present invention, the opening 12 does not necessarily have to communicate with the outside of the air-bag, and may be a communication part 12' communicating with an auxiliary chamber 14 of the same air-bag as shown in FIG. 5. The opening, formed as the communication part communicating with the auxiliary chamber, can be applied also to a curtain air-bag or the like that is required to have an internal pressure maintaining performance.

Figure 6:
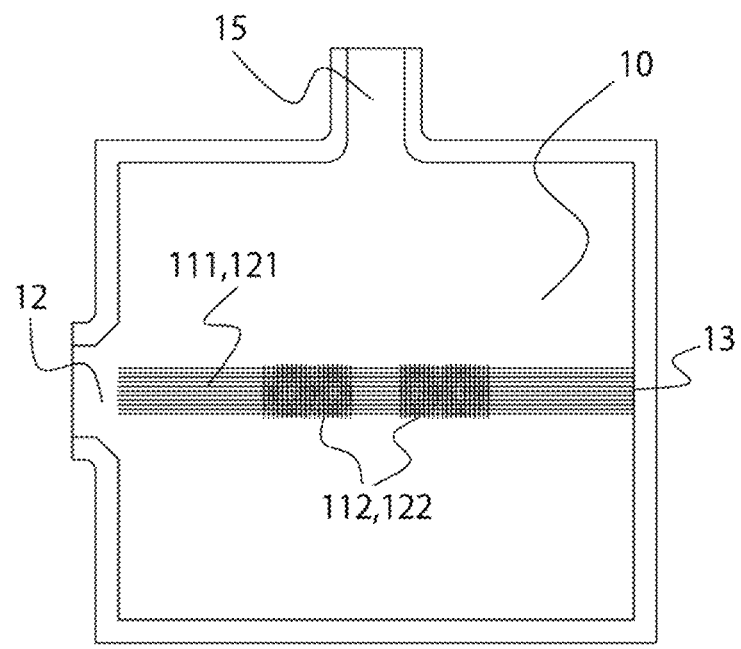
FIG. 6 is a view showing that the first yarn and the second yarn are arranged in a part of an opening according to an example of the present invention.
Figure 7:
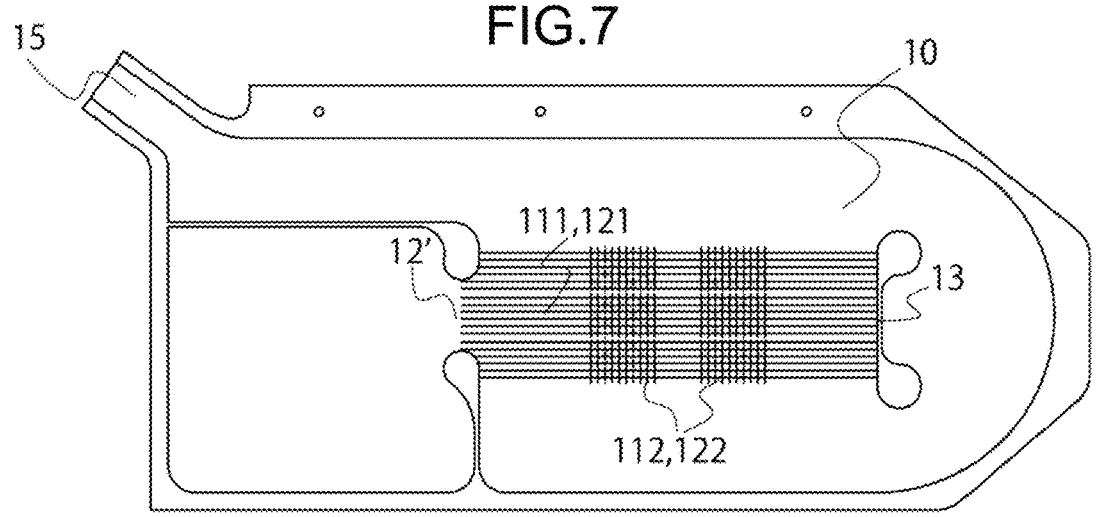
FIG. 7 is a view showing an air-bag including an auxiliary chamber according to an example of the present invention.

FIG. 6 and FIG. 7 show examples of the present invention that is applied to an actual air-bag, respectively. FIG. 6 shows an air-bag of the present invention including an opening that leads from a main chamber to outside, and FIG. 7 shows an air-bag of the present invention including a communication part that leads from a main chamber to an auxiliary chamber.

In the present invention, each of a number of filaments of a first yarn and a number of filaments of a second yarn may be two or more, and may be appropriately selected in accordance with a width of the opening or the communication part, and strength required for each yarn. If the number of the filaments of the first yarn or the second yarn increases, the strength of the yarn also increases, and a force to close the opening during the inflation also increases. In case where the strength of the air-bag is taken into consideration, five or more filaments preferably form each yarn, and eight or more filaments more preferably form each yarn.

A number of filaments of a first float yarn or a second float yarn to be caught on the first yarn or the second yarn may be one or more for one catch or weave, and the number is not specifically limited. However, in case where the strength of the air-bag is taken into consideration, five or more float yarns are preferably for use in each catch or weave, and ten or more float yarns are more preferably for use.

Filaments that constitute base fabric are for use in the first yarn and the second yarn as well as the first float yarn and the second float yarn, and the filaments that form the yarns and the float yarns are required to have a high strength. In consequence, mainly a filament having a higher fineness than the filament for use in the base fabric, or a filament of another stronger material may be used.

Figure 8:
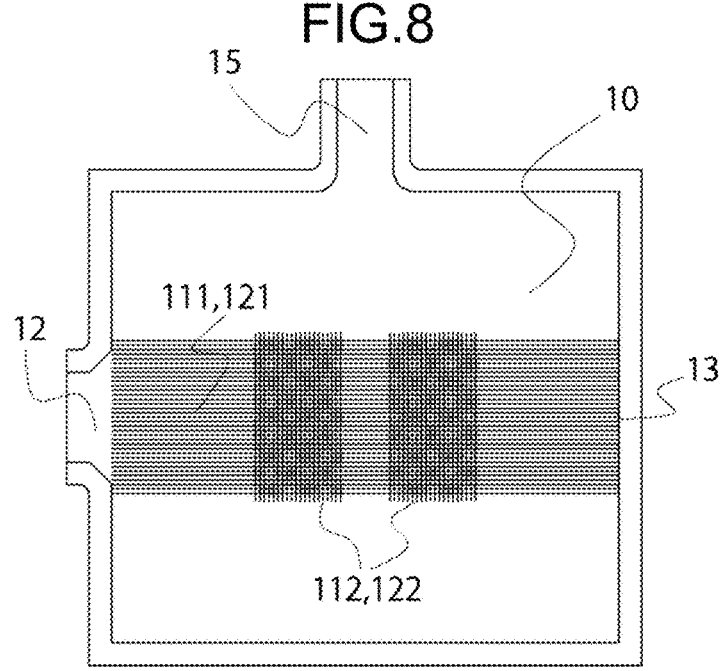
FIG. 8 is a view showing an air-bag in which a first yarn and a second yarn are arranged in an entire surface of an opening according to an example of the present invention.

As shown in FIG. 6, the first yarn and second yarn extending out of the opening 12 or the communication part 12' may have such a width that the yarns are arranged in a part of the opening or the communication part, but if the yarns are arranged to cover the whole surface of the opening as shown in FIG. 7 and FIG. 8, an effect of holding the internal pressure of the main chamber further enhances. As shown in FIG. 7 and FIG. 8, in case where a surface wider than the opening is covered, the filaments of the first yarn and the second yarn of a part beyond an opening width may extend from a non-inflating portion that comes in contact with the opening.

Figure 9:
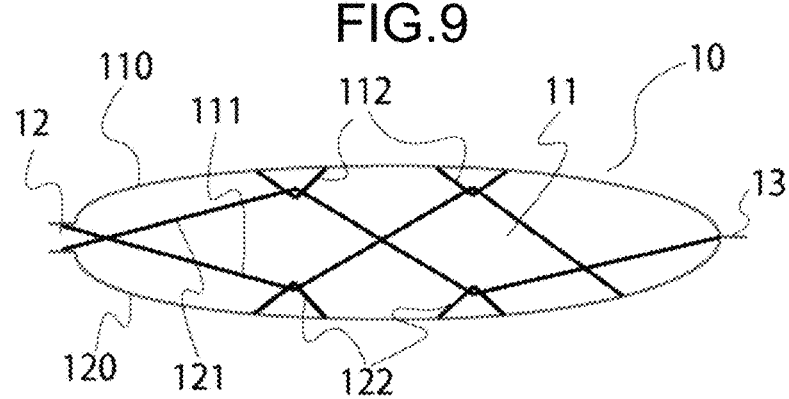
FIG. 9 is a schematic view in case where the first yarn is connected to a second fabric layer of a main chamber.

Furthermore, in the air-bag of the present invention, as shown in FIG. 9, even if an end of the first yarn 111 or the second yarn 121 opposite to the opening is not connected to the non-inflating portion but is connected to the first fabric layer 110 or the second fabric layer 120 of the main chamber, similar effects can be obtained.

Figure 10:
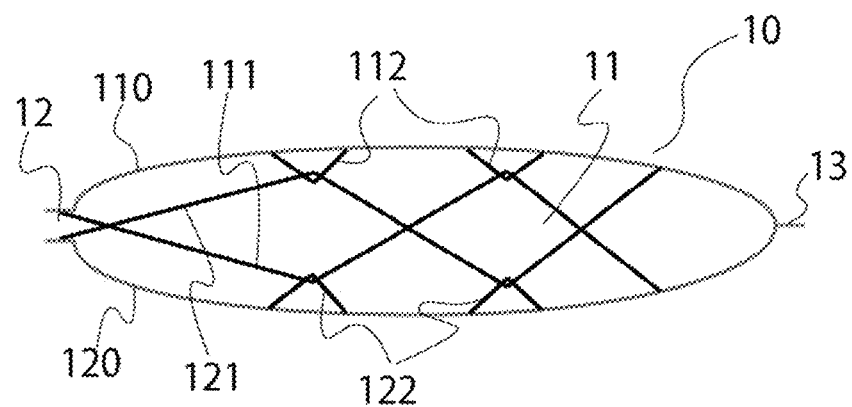
FIG. 10 is a schematic view in case where the first yarn and the second yarn are connected to a first or second fabric layer of the main chamber.
Figure 11:
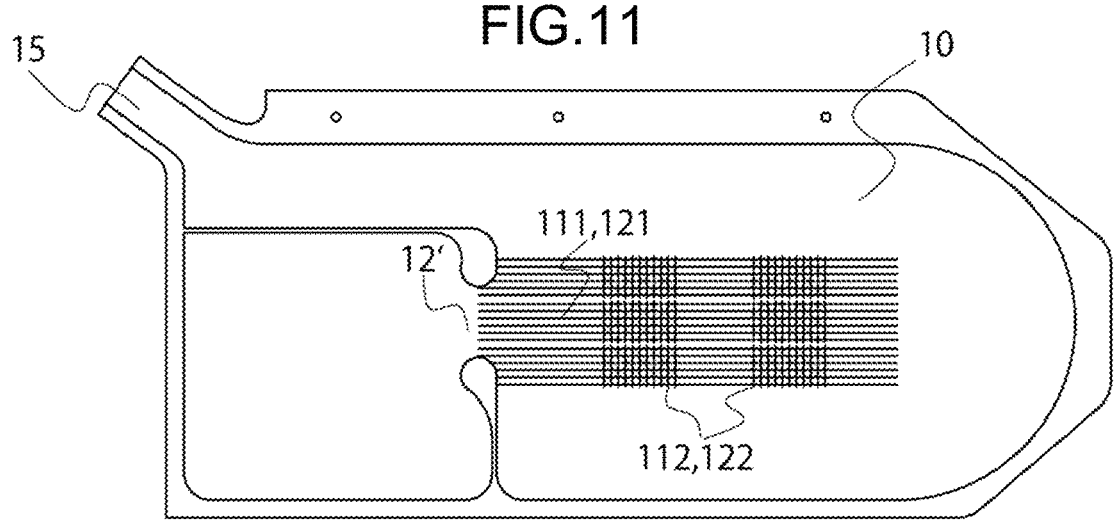
FIG. 11 is a view showing an example where the first yarn and the second yarn are connected to the first or second fabric layer of the main chamber in the air-bag including the auxiliary chamber according to an example of the present invention.

Additionally, as shown in FIG. 10, even if ends of both the first yarn 111 and the second yarn 121 opposite to the opening are not connected to the non-inflating portion but are connected to the first or second fabric layer 110 or 120 of the main chamber, the similar effects can be obtained. Since the first yarn and the second yarn are connected to the first or second fabric layer 110 or 120 of the main chamber, a degree of freedom in arrangement of the first yarn 111 and the second yarn 121 can increase. The fabric layers that connect the first yarn and the second yarn may be separate fabric layers for the first yarn and the second yarn. In case where the first yarn is connected to the first fabric layer, the second yarn may be connected to the second fabric layer, and in case where the first yarn is connected to the second fabric layer, the second yarn may be connected to the first fabric layer. FIG. 11 shows an example where the first yarn and the second yarn are connected to the first or second fabric layer of the main chamber in the air-bag of the present invention including the main chamber and the auxiliary chamber.

Figure 12:
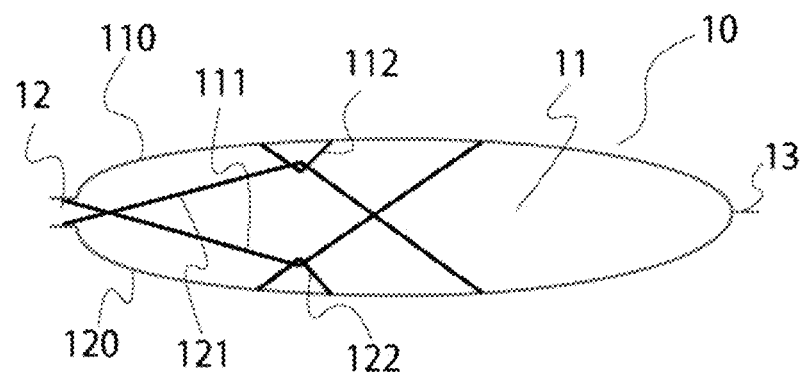
FIG. 12 is a schematic view in case where the first yarn is caught on the second float yarn and connected to the first fabric layer, and the second yarn is caught on the second float yarn and connected to the second fabric layer.

As an arrangement method of the first yarn 111 and the second yarn 121 that operate to close the opening when the air-bag inflates, as shown in FIG. 12, a method may be used that includes catching, on the second float yarns 122, the first yarn 111 extending out of the first fabric layer of the opening, and returning the yarn back to inflating portion base fabric of the first fabric layer, as well as catching, on the first float yarns 112, the second yarn extending out of an opening second fabric layer, and returning the yarn back to inflating portion base fabric of the second fabric layer.

Figure 13:
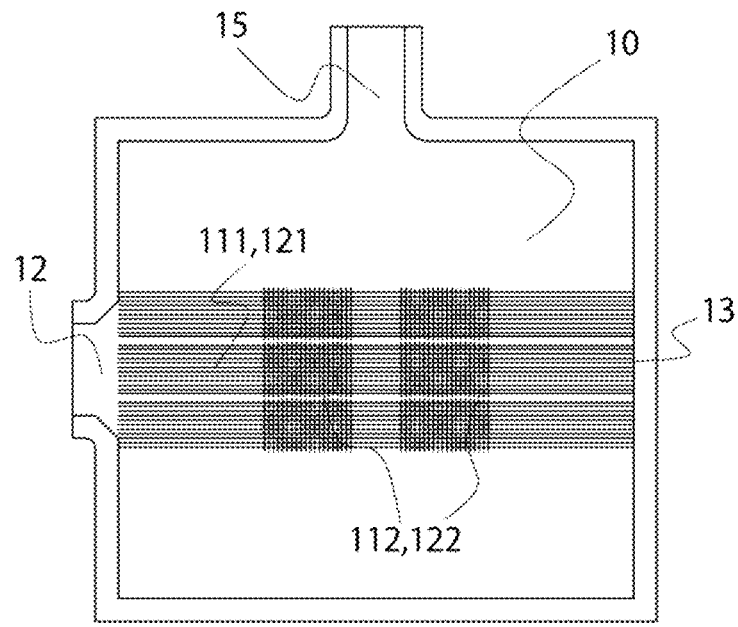
FIG. 13 is a view showing an example where three sets of first and second yarns are arranged in parallel to cover the whole opening.

In case where the opening is large, as shown in a structure of FIG. 13, a plurality of first yarns and a plurality of second yarns may be arranged in parallel, and caught on different first float yarns and second float yarns, respectively. This improves shape balance during inflation, increases a force to close the opening, and further enhances flatness of cushion during the inflation. FIG. 13 shows an example where three sets of first yarns and second yarns are arranged in parallel. FIG. 13 depicts with a space corresponding to one set of first and second yarns arranged in parallel for easy understanding. However, in case of application to an actual cushion, the sets are arranged via no gap, which excellently improves an internal pressure maintaining property.

Figure 14:
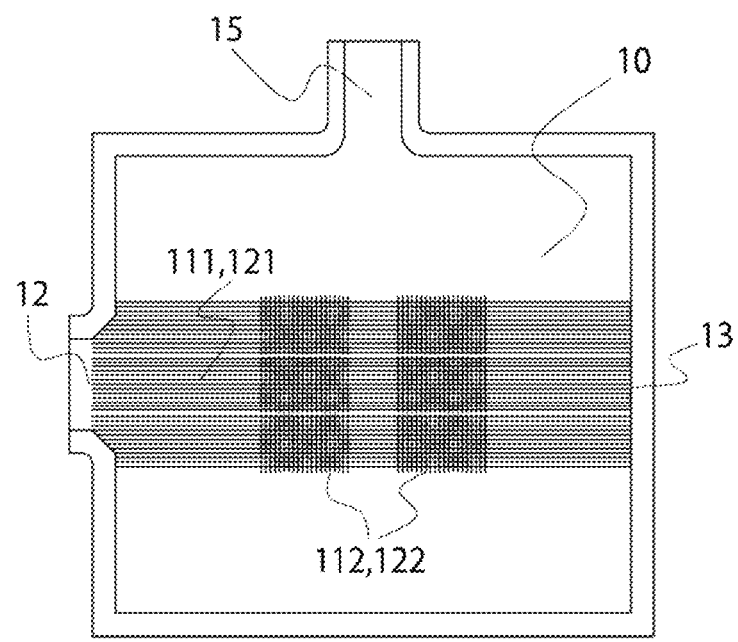
FIG. 14 is a view showing an example where the first yarn and the second yarn extend out of a middle of a passage extending from the opening toward an outside.

Furthermore, positions out of which the first yarn and the second yarn extend in the opening are not specifically limited as long as the positions are near the opening or the communication part. However, if the positions are set to be in a middle of a passage from a position along the non-inflating portion forming a main chamber outer periphery toward the outside of the air-bag as shown in FIG. 14 (in the case of opening 12), or if the positions are set to be in the communication part extending from the position along the non-inflating portion forming the main chamber toward the auxiliary chamber as shown in FIG. 7 (in the communication part 12'), the internal pressure maintaining property of the main chamber during main chamber inflation can be enhanced. To obtain a higher internal pressure maintaining property, as shown in FIG. 7 and FIG. 14, a width of a bag part from the main chamber opening toward the outside or the auxiliary chamber may be set to decrease toward the outside or the auxiliary chamber.

In the present invention, a size of the opening or the communication part may be appropriately determined in accordance with a performance required for the air-bag, and the size is not specifically limited, but is set preferably to a range of from about 20 mm to 200 mm, and more preferably to a range of from about 40 mm to 100 mm. If the opening is excessively large, there is also concern that the pressure of the air-bag rapidly lowers and that the air-bag cannot protect the occupant when making contact with the occupant. Furthermore, if the opening is excessively small, the gas cannot be released, and the degree of injury to the occupant tends to increase.

Figure 15:
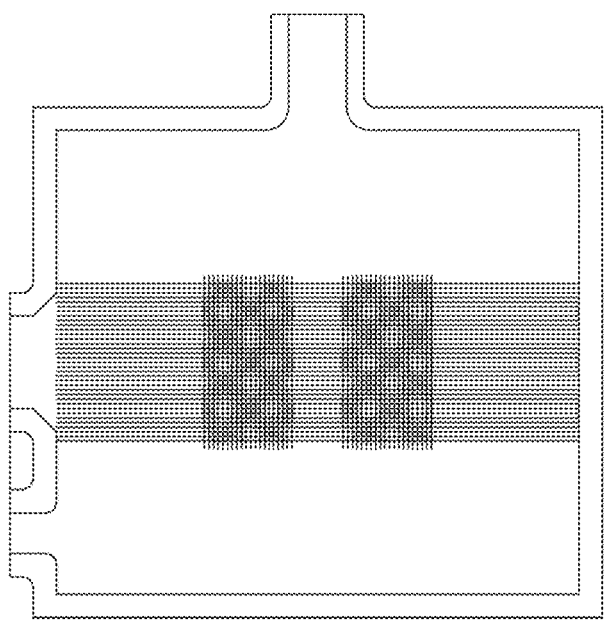
FIG. 15 is a view showing an example where a simple opening is added to the main chamber of the air-bag of the present invention.

Furthermore, in the present invention, as shown in FIG. 15, a plurality of openings may be provided separately from the opening of the present invention, for a purpose of adjusting the pressure of the main chamber, and the opening may be the opening according to the present invention, or, for example, an opening formed only by partially cutting a part of hollow-weave, a simple opening formed only by making a hole in the bag part, or any other openings.

Figure 16:
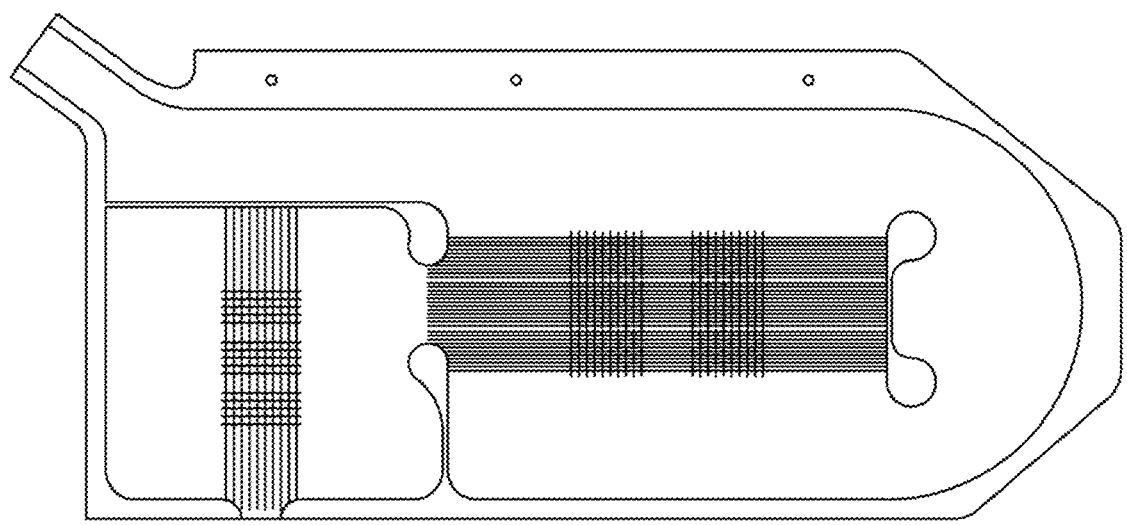
FIG. 16 is a view showing an example where the present invention is also applied to the auxiliary chamber of the air-bag of the present invention.

Additionally, in the air-bag of the present invention including the auxiliary chamber as shown in FIG. 16, a separate opening may be provided in the main chamber or the auxiliary chamber, and the opening may be the opening according to the present invention, the opening formed only by partially cutting a part of the hollow-weave, the simple opening formed only by making the hole in the bag part, or any other openings.

A fineness of a warp and a weft of the base fabric for use in the present invention may be selected from a thickness of a filament typically for use in air-bag base fabric, that is, a range of from 150 to 1000 dtex, and preferably within a range of from 235 to 700 dtex. If the fineness is smaller than 150 dtex, the resulting base fabric tends to hardly achieve the strength required for the air-bag, and if the fineness is in excess of 1000 dtex, the fabric tends to have an excessive mass per unit area.

The filaments for use in the present invention may have either the same or different single filament thickness, for example, preferably within a range of from 0.5 to 6 dtex. Furthermore, the single filament having a strength of 7 cN/dtex or more, preferably 8 cN/dtex or more may be used. Additionally, a cross-sectional shape of the single filament may be appropriately selected from circular, elliptical, flat, polygonal, hollow, and other shapes as long as it causes no problem to manufacturing and physical properties of a textile. Also, a plurality of filaments with different finesses and cross-sectional shapes may be combined by doubling, twisting or the like, for use.

The base fabric comprising these filaments for use in the present invention preferably has a mass per unit area of 260 g/m$^2$ or less, and a tensile strength of 650 N/cm or more. It can be considered that a base fabric with a mass per unit area and a tensile strength within the ranges above is lightweight and has excellent physical properties. Note that the term mass per unit means a weight of an unprocessed base fabric before application of an impervious material to be described later, and the like.

If the mass per unit area is in excess of 260 g/m$^2$, the air-bag has an increased weight and hardly achieves a desired weight reduction. Also, if the tensile strength is smaller than 650 N/cm, the air-bag can hardly achieve required physical properties.

The base fabric for the air-bag of the present invention may be manufactured with a weaving machine appropriately selected from various weaving machines for use in weaving a usual industrial textile, including a shuttle weaving machine, a water-jet weaving machine, an air jet weaving machine, a rapier weaving machine, and a projectile weaving machine.

Furthermore, the fiber yarns constituting the air-bag base fabric of the present invention may include natural fibers, chemical fibers, inorganic fibers, and are not specifically limited. In particular, synthetic fiber filaments are preferable from viewpoints of its general-purpose use, manufacturing processes of the base fabric, and physical properties of the base fabric. For example, one or two or more fibers may be appropriately selected from aliphatic polyamide fiber obtained by polymerization, copolymerization, or mixing of nylon 6, nylon 66, nylon 46, nylon 610, nylon 612, and the like, copolymerized polyamide fiber of an aliphatic amine represented by nylon 6T, nylon 6I, and nylon 9T and an aromatic carboxylic acid, polyester fiber obtained by polymerization, copolymerization, or mixing of polyethylene terephthalate, polytrimethylene terephthalate, polybutylene terephthalate, polyethylene naphthalate, and the like, ultra-high molecular weight polyolefin fiber, chlorofiber such as vinylidene and polyvinyl chloride, fluorine-based fiber containing polytetrafluoroethylene, polyacetal-based fiber, polysulfone-based fiber, polyphenylenesulfide-based fiber (PPS), polyetheretherketone-based fiber (PEEK), wholly aromatic polyamide fiber, wholly aromatic polyester fiber, polyimide-based fiber, polyetherimide-based fiber, polyparaphenylenebenzobisoxazole-based fiber (PBO), vinylon-based fiber, acrylic-based fiber, cellulose-based fiber, silicon carbide-based fiber, alumina-based fiber, glass-based fiber, carbon-based fiber, steel-based fiber, and the like. Particularly, nylon 66 fiber and polyester-based fiber are preferable in terms of physical properties, durability, and heat resistance. Also, polyester-based fiber and nylon 6 fiber are also preferable from the viewpoint of recycling.

In these fiber yarns, for improving spinnability, processability, and the durability, one or two or more of usually used various additives may be used. Examples of the additives include heat stabilizers, antioxidants, light stabilizers, aging retarders, lubricants, smooth finishing agents, pigments, water-repellents, oil-repellents, masking agents such as titanium oxide, lustering agents, fire retardants, and plasticizers. Furthermore, the yarns may be processed by twisting, bulking, crimping, winding, and sizing. Furthermore, the yarns may be in the form of staple spun yarns other than the form of continuous filaments, or composite yarns thereof.

Furthermore, the textile for use in the present invention preferably includes an impervious material in terms of ensuring airtightness of the air-bag. The impervious material is a material that substantially prevents air from passing therethrough as described below, for example, and the term impervious means providing a zero reading in method A (Frazier method) of JIS L1096 (Testing methods for woven and knitted fabrics). This impervious material is applied to the textile from one or both sides by a method to be described later. This impervious material may be interposed in any of the surface of the base fabric, intersection portions of yarn bundles constituting the base fabric, gap portions of fiber single filaments, and the like.

Examples of an application method include 1) a coating method (knife, kiss, reverse, comma, slot die, lip, etc.), 2) a dipping method, 3) a printing method (screen, roll, rotary, gravure, etc.), 4) a transferring method (transfer), and 5) a laminating method. Particularly, the coating method or the laminating method is preferable in that an effect of maintaining the internal pressure is highly achieved.

The impervious material may be any material typically used for the air-bag base fabric if it satisfies, for example, the heat resistance, wear resistance, adhesion to the base fabric, flame retardancy, and tack freeness. For example, one or two or more materials may be used out of a silicone-based resins or rubbers, polyurethane-based resin or rubber (including those modified with silicone or fluorine), a fluorine-based resin or rubber, a chlorine-based resin or rubber, a polyester-based resin or rubber, a polyamide-based resin or rubber, an epoxy-based resin, a vinyl-based resin, an urea-based resin, and a phenol-based resin. Particularly, the silicone resin is preferable in terms of the heat resistance and the flame retardancy.

Properties of the material as a solution may be appropriately selected from a solvent-less type, solvent type, water dispersion type, water emulsion type, and water-soluble type in accordance with an application amount, an application method, material processability or stability, required characteristics, and the like.

When adopting the coating method, the application amount for one surface is preferably from 10 to 150 g/m$^2$, and more preferably from 50 to 100 g/m$^2$. If the material forms a layer, the layer preferably has a thickness of 10 μm or more. If the application amount for one surface is less than 10 g/m$^2$ or the layer thickness is less than 10 μm, it tends to be difficult to achieve required airtightness.

Furthermore, when adopting the laminating method, the processing method is not specifically limited, and known methods are available including a dry lamination method in which an adhesive is applied onto a base fabric or a film and dried to evaporate the solvent and then the lamination is thermocompressed, a wet lamination method in which a water-soluble adhesive is applied to bond a base fabric or a film, and then the adhesive is dried, an extrusion lamination method in which a molten resin is extruded onto a base fabric before laminating the base fabric and a film, a thermal lamination method in which a resin layer formed in a film shape in advance is laminated and then the lamination is thermocompressed, and the thermal lamination method is preferable from the viewpoint of processing costs and ecology.

The material to be laminated is not specifically limited, and known materials can be used including homopolymers or copolymers of polyester-based resins, polyamide-based resins, polyolefin-based resins, copolymers of these resins with other materials, and modifications thereof. Also, known methods can be used such as processing the material with an adhesion imparting agent like a polyolefin-based resin in advance, or processing a base fabric with a film having an adhesive layer placed on one surface thereof. Examples of thermoplastic resins for use in the adhesive layer include homopolymers and copolymers of polyamide-based resins, polyolefin-based resins, polyurethane-based resins, copolymers of these resins with other materials, and modifications thereof that have preferable a melting point of 200° C. or lower.

A thickness of a lamination coating material is not specifically limited, and may be appropriately set within a range of from 10 to 100 μm in accordance with a purpose. In general, a thickness of from 10 to 40 μm is preferable for a curtain air-bag that is not intended for overturn of an automobile, and a thickness of from 40 to 100 μm is preferable for a hollow-weave curtain bag that is also intended to protect the occupants in case of the overturn of the automobile.

Furthermore, the impervious material may have one or two or more additives mixed thereto as selected from typically used various additives for improving processability, adhesiveness, surface characteristics, the durability or the like, in addition to the main material. Examples of the additives include crosslinking agents, tackifiers, reaction accelerators, reaction retarders, heat stabilizers, antioxidants, light stabilizers, aging retarders, lubricants, smooth finishing agents, anti-block agents, pigments, water-repellents, oil-repellents, masking agents such as titanium oxide, lustering agents, fire retardants, and plasticizers.

Additionally, various pre-treatment agents, adhesion improvers, and the like may be added to the impervious material in order to improve adhesion with the base fabric, or the surface of the base fabric may be pre-treated with a primer treatment or the like. Furthermore, to improve the physical properties of the material or impart the heat resistance, aging resistance, antioxidant properties, and the like, after application of the material to the base fabric, it may be dried, cross-linked, vulcanized, for example, by heat treatment, pressurized heat treatment, high energy treatment (high frequency, electron beam, UV ray), or the like.

In the hollow weaving, the textile is typically woven using sized original yarns as warps, and in order to remove an oil solution, a sizing agent, and the like adhering to the original yarns so that adhesiveness of the coating agent or laminating material to the base fabric is not inhibited, the textile is preferably scoured by a jigger scouring machine or a continuous scouring machine with a plurality of scouring baths prior to the coating or laminating. After scoring, the textile is dried with a cylinder dryer, for example. After drying, the textile is directly subjected to the next coating step in some cases, but they are preferably heat set following the scouring and the drying for control of dimensions and woven fabric density.

After coating or laminating, the base fabric is cut to predetermined dimensions and a shape by a laser cutter, undergoes some process such as sewing accessories like a strap for fixing the air-bag, to the base fabric and reinforcing a mounting portion to a vehicle body, and after that, the base fabric is made into a product.

The specifications, shape, and capacity of the air-bag of the present invention may be selected in accordance with a region to which the air-bag is disposed, use application, storage space, a performance of absorbing occupant impact, an output of the inflator, and the like.

Furthermore, for restricting protrusion of the air-bag toward the occupant and controlling the thickness during the inflation, the air-bag may be provided with a tether or a gas flow adjustment cloth on the inside and a strip-shaped cloth or a holding cloth called a flap on the outside.

Additionally, a heat-resistant protective cloth for protection against hot gas or a mechanical reinforcing cloth may be provided around an inflator nozzle in accordance with the characteristics of the inflator to be used. The protective cloth and reinforcing cloth may be formed from a base fabric that is formed from a heat resistant material like a heat resistant fiber material such as wholly aromatic polyamide fiber, wholly aromatic polyester fiber, PBO fiber, polyimide fiber, or fluorine-containing fiber, or a textile manufactured separately using yarns having a thickness that is equal to or thicker than that of an air-bag body base fabric. Also, a textile having a heat resistant coating material applied thereto may be used.

The air-bag may be folded when stored in such manner as folding screen fold of folding the air-bag from a center symmetrically in a vertical or horizontal direction or fold of compressing the air-bag toward the center in several directions as in the driver's seat air-bag, roll fold, bellows fold, or fanfold fold in a folding screen like manner as in the front-passenger's seat air-bag, combination thereof, alligator fold as in the side bag built into the seat, or roll fold or bellows fold as in the side curtain air-bag.

The air-bag of the present invention can be applied into several use applications in passenger vehicles, commercial cars, buses, and motorcycles such as several occupant protection bags including side bags and side curtain air-bags at the driver's seat and the front-passenger's seat for head-on collision or side collision, head rest bags for rear seat protection, rear-end collision protection, knee bags and foot bags for leg portion and foot portion protection, mini-bags for infant protection (child seat), bags for air-belts, and air-bags for pedestrian protection, and also can be applied to other varieties of applications in ships, trains and electric trains, planes, and amusement facilities if the air-bag is functionally satisfactory.

EXAMPLE

Hereinafter, the present invention will be described further specifically based on an example. Hereinafter, description will be made as to a preparation method of an air-bag and a performance evaluation method of air-bag characteristics that were performed in the example.

Each of air bag bodies in the present example and comparative examples was prepared using 470 dtex nylon 66 fiber by hollow weaving at a one-surface warp density of 57 warps/inch and a weft density of 49 wefts/inch.

A base fabric surface was laminated with a laminate film having a thickness of 50 μm.

Figure 17:
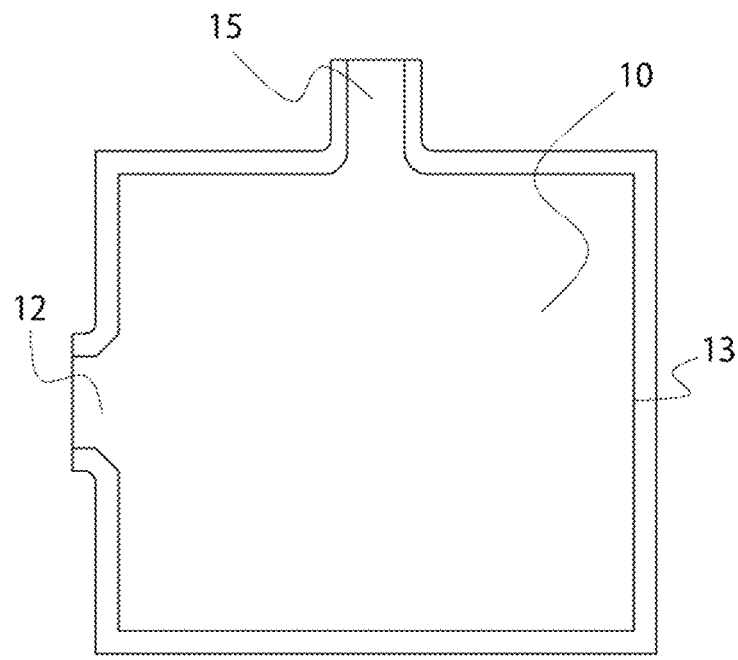
FIG. 17 is a view showing an air-bag including a simple opening and used as Comparative Example 1.
Figure 18:
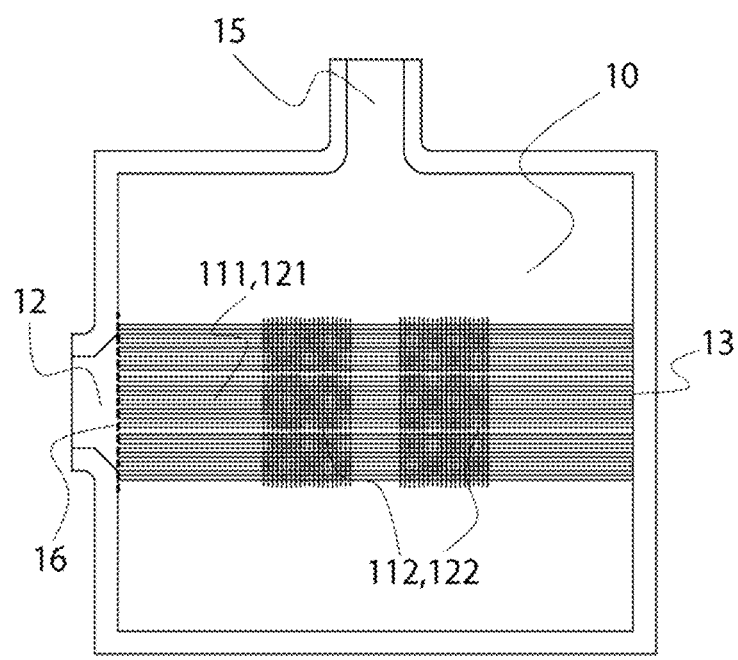
FIG. 18 is a view showing an air-bag including an opening sewn and closed and used as Comparative Example 2.

In the present example, for a main chamber bag part, an air-bag having dimensions of longitudinally 40 cm×laterally 45 cm and shown in FIG. 14 was used. FIG. 17 shows an air-bag used as Comparative Example 1 that is the air-bag including a simple opening formed only by opening hollow-weave. FIG. 18 shows a bag used as Comparative Example 2 that is an air-bag of the present invention including an opening 12 closed by sewing the opening with 50 stitches/100 mm in a sewn region 16 shown by a broken line.

As to air-bags of Example, Comparative Example 1 and Comparative Example 2, each air-bag was deployed at a high speed from a gas introducing portion 15 by use of an air-bag deployment test device (Cold Gas System manufactured by Microsystem Technologies) to jet helium gas at the high speed, and an internal pressure of a main chamber was measured. A test was performed on deployment conditions including a tank capacity of 0.75 L, an orifice diameter of 0.4 inches, and a supply pressure of 5 MPa.

Figure 19:
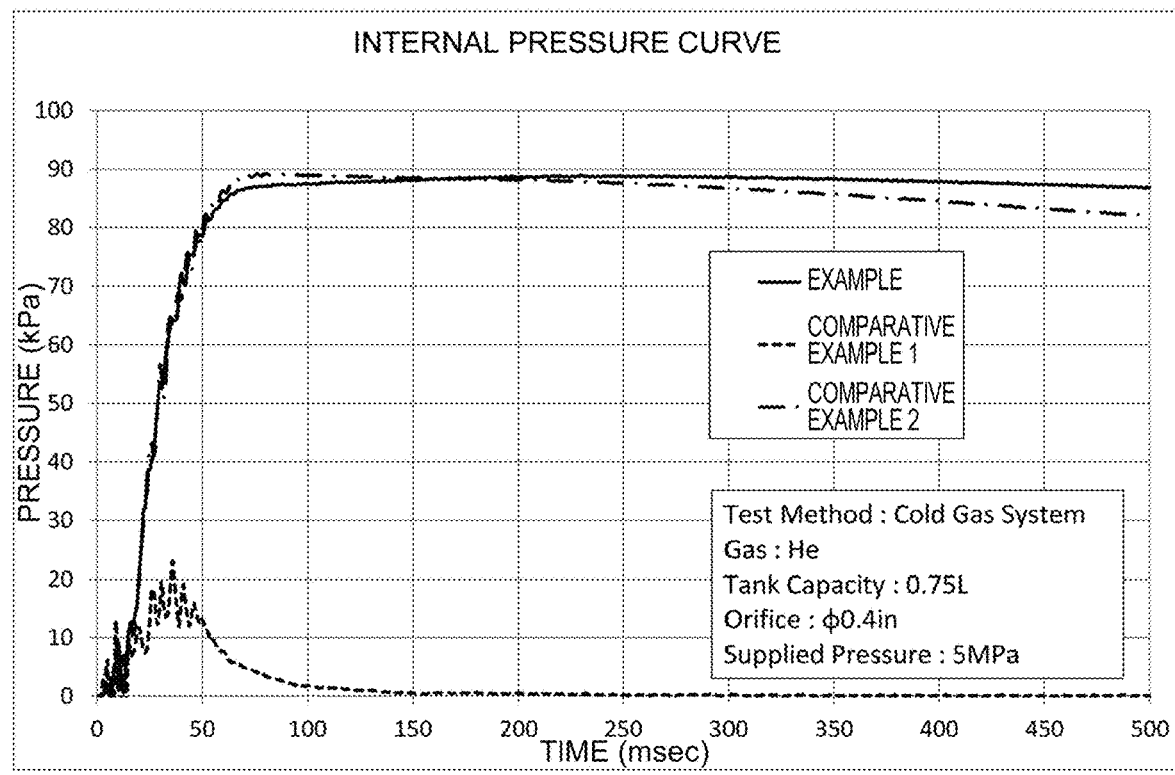
FIG. 19 is an internal pressure graph of Example, Comparative Example 1 and Comparative Example 2 that are deployed at high speeds.

FIG. 19 shows test results of the deployment test. The ordinate indicates a pressure (kPa), and the abscissa indicates time (msec).

As seen from FIG. 19, in the air-bag of Comparative Example 1 (FIG. 17) including the simple opening, the internal pressure rose only up to about 20 kPa at maximum, and was almost zero after elapse of 150 msec, while in Example (FIG. 14) of the present invention, the internal pressure rose up to about 90 kPa in about the same manner as in the air-bag of Comparative Example 2 (FIG. 18) including the sewn and closed opening. From this, it can be confirmed that the air-bag of the present invention includes an opening to release the gas, but the opening closes during the deployment of the air-bag and has properties of maintaining about the same degree of high internal pressure as in the air-bag including the sewn and closed opening. From this, it can be seen that the air-bag of the present invention includes the opening, but the internal pressure can rise up to a predetermined pressure with a smaller amount of inflator gas.

Figure 20:
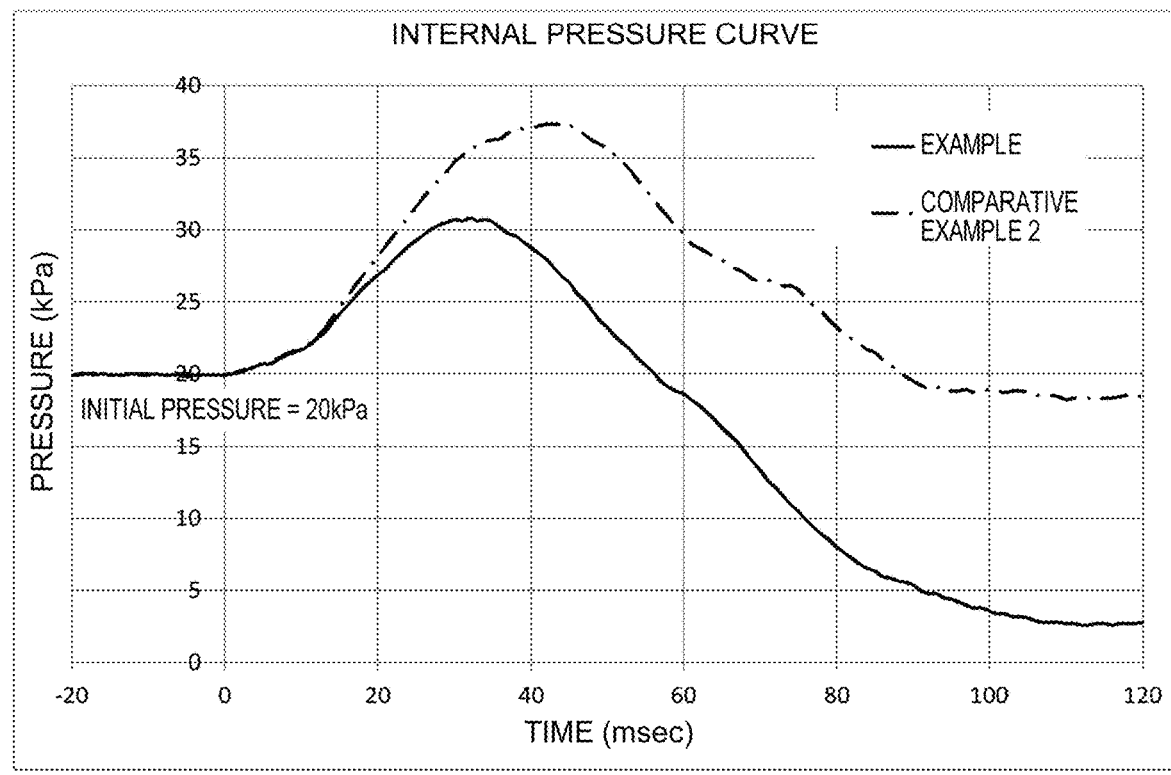
FIG. 20 is a diagram showing internal pressure curves of Example and Comparative Example 2 during a drop weight test.

Next, as to the air-bag of Example (FIG. 14) and the air-bag of Comparative Example 2 (FIG. 18), each air-bag inflated at about 20 kPa by supplying compressed air from the gas introducing portion 15 was laid on a floor, and a 10 kg weight was let to free fall from a height of 1 m and dropped onto the air-bag. At that time, change in internal pressure of the air-bag was measured. FIG. 20 shows internal pressure measurement results. Here, as to the air-bag of Comparative Example 1, an internal pressure could not be kept at 20 kPa with the compressed air, and hence this test was not performed.

In case of the air-bag including the sewn opening shown in Comparative Example 2 (FIG. 18), when the weight is dropped onto the inflated air-bag and the weight abuts on the air-bag, the air-bag has its internal pressure started to rise, absorbs impact, pushes back the weight, and returns to its original state, and then the internal pressure returns almost to its initial state.

However, in the air-bag of the present invention shown in Example (FIG. 14), when the weight abuts on the air-bag in the same manner as in Comparative Example 2 (FIG. 18), the internal pressure starts rising. However, when the air-bag is largely deformed, the gas is released from the opening, and hence the internal pressure rises in a moderate curve. A maximum internal pressure is lower than that of Comparative Example 2. Then, the air-bag absorbs the impact, pushes back the weight and is going to return to its original state. However, a large amount of gas is released from the opening, and hence the internal pressure is stabilized noticeably below an initial pressure. Thus, in the present invention, the air-bag releases the gas to lower the maximum internal pressure when making contact with the occupant, so that the degree of injury to the occupant can reduce.

As above, it has been confirmed that in the present example, as compared with the comparative examples, the internal pressure of the main chamber can immediately rise from an initial state of air-bag deployment, and when making contact with the occupant, the air-bag prevents the internal pressure from rising excessively, and reduces the degree of injury to the occupant.

REFERENCE SIGNS LIST 10 air-bag
11 main chamber
12 opening
12' communication part 13 non-inflating portion
14 auxiliary chamber
15 gas introducing portion
16 sewn region
110 first fabric layer
111 first yarn
112 first float yarn
113 direction of a force to be applied to the first yarn
120 second fabric layer
121 second yarn
122 second float yarn
123 direction of a force to be applied to the second yarn

The invention claimed is:

1. An air-bag (10) integrally formed by hollow weaving, the air-bag (10) comprising a main chamber (11) that inflates, and a non-inflating portion (13),
wherein the main chamber (11) has a two-layer structure comprising a first fabric layer (110) and a second fabric layer (120),
the main chamber (11) includes an opening (12) continuously formed by the hollow weaving and communicating with an outside, or a communication part (12') communicating with an auxiliary chamber in the air-bag,
the first fabric layer (110) comprises one or more first float yarns (112) once separating from the first fabric layer (110) and returning to the first fabric layer (110), and
the second fabric layer (120) comprises one or more second float yarns (122) once separating from the second fabric layer (120) and returning to the second fabric layer (120),
wherein the air-bag has a structure where a plurality of filaments organizing the first fabric layer (110) extend separately from the first fabric layer (110) in the opening (12) or the communication part (12') to either the non-inflating portion (13) or to the first and second fabric layer and not to the non-inflating portion (13), to form a first yarn (111), the first yarn (111) is, in order seen from the opening (12) or the communication part (12'), caught on the one or more second float yarns (122), or constitutes a woven organization with the second float yarns (122), and is subsequently caught on the one or more first float yarns (112), or constitutes a woven organization with the first float yarns (112), the structure being repeated at least once, and
the air-bag has a structure where a plurality of filaments organizing the second fabric layer (120) extend separately from the second fabric layer (120) in the opening (12) or the communication part (12') to either the non-inflating portion (13) or to the first and second fabric layer and not to the non-inflating portion (13), to form a second yarn (121), and the second yarn (121) is, in order seen from the opening (12) or the communication part (12'), caught on the one or more first float yarns (112), or constitutes a woven organization with the first float yarns (112), and is subsequently caught on the one or more second float yarns (122), or constitutes a woven organization with the second float yarns (122), the structure being repeated at least once,
wherein during air-bag inflation, the first yarn (111) and the second yarn (121) are pulled by the first float yarns (112) and the second float yarns (122) to apply tension, and operate to close the opening (12) or the communication part (12'), and
when making contact with an occupant, by deformation of the air-bag due to the contact, the first yarn (111) and the second yarn (121) are loosened, and the opening (12) or the communication part (12') is opened to release gas from the main chamber.

2. The air-bag according to claim 1, wherein when at least one of the first yarn (111) and the second yarn (121) extending out of the opening (12) or the communication part (12') is, in the case of the first yarn (111), caught on the one or more second float yarns (122), or constitutes a woven organization with the second float yarns (122), or is, in the case of the second yarn (121), caught on the one or more first float yarns (112), or constitutes a woven organization with the first float yarns (112), and is connected to an original fabric layer.

3. The air-bag according to claim 2, wherein the first yarn (111) and the second yarn (121) are arranged over a full width of the opening (12) or the communication part (12'), or over a range in excess of the full width.

4. The air-bag according to claim 1, wherein the first yarn (111) and the second yarn (121) are arranged over a full width of the opening (12) or the communication part (12'), or over a range in excess of the full width.

5. The air-bag according to claim 1, wherein the first yarn (111) and the second yarn (121) are arranged over a full width of the opening (12) or the communication part (12'), or over a range in excess of the full width.

* * * * *